United States Patent [19]

Rieve et al.

[11] 3,909,391

[45] Sept. 30, 1975

[54] RECOVERY OF ALUMINUM CHLORIDE/PALLADIUM CHLORIDE HYDROCRACKING CATALYST MIXTURE

[75] Inventors: Robert W. Rieve, Springfield; Harold Shalit, Drexel Hill, both of Pa.

[73] Assignee: Atlantic Richfield Company, Los Angeles, Calif.

[22] Filed: Aug. 5, 1974

[21] Appl. No.: 494,659

Related U.S. Application Data

[63] Continuation-in-part of Ser. No. 351,075, April 13, 1973, Pat. No. 3,847,795.

[52] U.S. Cl. ............... 208/108; 208/117; 208/140; 252/429 R; 252/442
[51] Int. Cl.². B01J 23/96; B01J 31/30; C07C 3/18; C10G 13/08
[58] Field of Search .................... 208/108, 117, 140; 252/429 R, 442; 260/683.53, 683.75

[56] References Cited
UNITED STATES PATENTS

| | | | |
|---|---|---|---|
| 1,869,799 | 8/1932 | Danner | 208/108 |
| 2,191,156 | 2/1940 | Pier | 208/10 |
| 2,692,224 | 10/1954 | Heinemann | 208/112 |
| 2,964,462 | 12/1960 | Thomas et al. | 208/108 |
| 3,231,517 | 1/1966 | Bloch et al. | 252/442 |
| 3,409,684 | 11/1968 | Aristoff et al. | 260/667 |

*Primary Examiner*—Delbert E. Gantz
*Assistant Examiner*—G. E. Schmitkons
*Attorney, Agent, or Firm*—Delbert E. McCaslin

[57] ABSTRACT

Method for the recovery of an aluminum chloride-palladium chloride catalyst mixture or complex used to hydrocrack high molecular weight hydrocarbons containing sulfur and nitrogen compounds at elevated temperatures and hydrogen pressures, the catalyst being soluble in such hydrocarbons at the hydrocracking temperatures. The recovered catalyst is in the form of a bottoms fraction concentrate resulting from the hydrocracking process and may be reused without any pre-treatment.

7 Claims, No Drawings

RECOVERY OF ALUMINUM CHLORIDE/PALLADIUM CHLORIDE HYDROCRACKING CATALYST MIXTURE

CROSS REFERENCE TO RELATED APPLICATIONS

This application is a continuation-in-part application of application Ser. No. 351,075, filed Apr. 13, 1973 now U.S. Pat. No. 3,847,795 issued to Robert W. Rieve and Harold Shalit Nov. 12, 1974 entitled HYDROCRACKING HIGH MOLECULAR WEIGHT HYDROCARBONS CONTAINING SULFUR AND NITROGEN COMPOUNDS which application discloses certain aspects of the present invention.

BACKGROUND OF THE INVENTION

In the above co-pending application of Robert W. Rieve and Harold Shalit Ser. No. 351,075 which application is incorporated herein by reference there is disclosed and claimed a method of hydrocracking high molecular weight hydrocarbons containing sulfur and nitrogen compounds which comprises contacting said hydrocarbons at temperatures in the range of from 400° to 1200°F. at pressures in the range of from 100 psig to 5000 psig with from 100 to 5000 standard cubic feet of hydrogen per barrel of hydrocarbon charge in the presence of a catalyst soluble in said hydrocarbons at said temperatures, said catalyst being produced from a mixture of aluminum chloride and palladium chloride wherein in the palladium chloride-aluminum chloride catalyst the palladium ranges from 0.001 to 1.0 weight per cent based on the weight of the hydrocarbon charge and the aluminum chloride ranges from 0.005 to 10.0 weight per cent based on the weight of the hydrocarbon charge with the molar ratio of aluminum chloride to palladium chloride being at least 2:1.

The present invention is directed to a simple and effective method for the recovery and reuse for hydrocracking under the above conditions large amounts of high molecular weight hydrocarbons without any substantial loss in activity of the aluminum chloride-palladium chloride catalyst utilized in the above-described method of hydrocracking high molecular weight hydrocarbons, i.e. those boiling above about 400°F. and including those boiling above 800°–900°F. wherein such hydrocarbon stocks contain relatively large amounts of sulfur and nitrogen, i.e. ranging from 0.3 combined weight per cent sulfur and nitrogen for so-called sweet crudes up to 0.75 combined weight per cent for certain stocks to 1.5 and higher for residua, shale oils and the like, utilizing a homogeneous catalyst system comprising a palladium chloride-aluminum chloride complex catalyst which is soluble in the hydrocarbon reaction medium at hydrocracking conditions, which catalyst complex is not significantly poisoned by the sulfur and nitrogen compounds.

SUMMARY OF THE INVENTION

This invention relates to a method for the recovery of an aluminum chloride-palladium chloride hydrocracking catalyst mixture utilized in hydrocracking high molecular weight hydrocarbons containing sulfur and nitrogen compounds at elevated temperatures and hydrogen pressures, which catalyst is soluble in the hydrocarbons at such temperatures, by reducing the temperature of the hydrocarbon reaction products to a suitable temperature to substantially insolubilize and precipitate the catalyst, removing the hydrocarbon reaction products leaving bottoms fraction/catalyst concentrate and recovering the concentrate for reuse in the form of a "heel" in the reactor or for recycle and the hydrocracking of fresh feed hydrocarbons.

It is an object of this invention therefore to provide a method for the recovery of an aluminum chloride-palladium chloride hydrocracking catalyst mixture utilized to hydrocrack high molecular weight hydrocarbons.

It is another object of this invention to recover an aluminum chloride-palladium chloride hydrocracking catalyst in the form of a bottoms fraction catalyst concentrate resulting from the hydrocracking process.

It is a further object of this invention to recover the valuable aluminum chloride-palladium chloride catalyst as a bottoms fraction catalyst concentrate and to reuse the concentrate for hydrocracking fresh feed high molecular weight hydrocarbons without any pretreatment of the catalyst concentrate or hydrocarbon feed.

Other objects of this invention will be apparent from the detailed description of the invention which follows and from the claims.

DESCRIPTION OF THE INVENTION

In accordance with the present invention, a catalyst comprising an aluminum chloride-palladium chloride mixture or complex which is utilized in hydrocracking high molecular weight hydrocarbons containing sulfur and nitrogen compounds at temperatures from 400° to 1200°F. at pressures of from 100 psig to 5000 psig with from 100 to 5000 standard cubic feet of hydrogen per barrel of hydrocarbon charge is recovered for reuse by cooling the hydrocarbon reaction products, after a time sufficient to accomplish the desired degree of hydrocracking, to at least about 250°F. to substantially insolubilize and precipitate the aluminum chloride-palladium chloride catalyst mixture or complex. The hydrocarbon reaction products are then removed leaving a bottoms fraction containing the aluminum chloride-palladium chloride mixture or complex in the form of a bottoms fraction catalyst concentrate which may be recovered for reuse as a hydrocracking catalyst without pre-treatment of the concentrate and under the hydrocracking reaction conditions set forth herein and in the above co-pending application of Robert W. Rieve and Harold Shalit, Ser. No. 351,075.

The high molecular weight hydrocarbons which are hydrocracked in the presence of the aluminum chloride-palladium chloride catalyst and, after recovery, the bottoms fraction catalyst concentrate, are characterized by having large amounts, i.e. ranging from a minimum of 0.3 to 1.5 combined weight per cent to very large amounts such as 20 combined weight per cent, for example, of sulfur and nitrogen combined. In general, the stocks are characterized by having a boiling point for the predominant portion of the stock in excess of 400°F. Feed stocks such as full boiling range crudes containing 40 volume per cent or more in the boiling range up to 400°F. can, of course, be processed by the method of this invention, but the purpose of the invention is to hydrocrack the fraction boiling above 400°F. to produce motor fuel boiling in the gasoline boiling range, i.e. having an end point of about 400°F. Hence the method has its greatest value in hydrocracking the heavier or high molecular weight fractions.

Moreover, these fractions tend to contain the heterocyclic sulfur and nitrogen compounds. Thus examples of stocks which are particularly suitable for hydrocracking by the method of this invention are the so-called sour crude oils, i.e. high sulfur crudes, shales oils since these are well known to have high nitrogen contents, tars such as those extracted from tar sands, for example the widely publicized Athabaska tar sands of Canada, synthetic crude oils such as those derived from coal, lignite and similar mineral deposits, residua obtained by "topping" a crude, i.e. the residue after removing by distillation the lower boiling hydrocarbons from crude oils, or the residua produced from other conventional petroleum refining processes and any similar high molecular weight hydrocarbonaceous stocks.

The hydrocracking process using the recovered catalyst can operate at temperatures in the range of from 400° to 1200°F. with from 500° to 1000°F. being somewhat more preferred. Hydrogen pressures in the range of from 100 psig to 5000 psig can be employed with from 500 psig to 3000 psig being preferred for most charge stocks and with certain stocks even less severe conditions, i.e. 500 psig to 1000 psig being completely satisfactory.

The ratio of hydrogen to hydrocarbon charge can range from 100 to 5000 SCF (standard cubic feet) of hydrogen per barrel of hydrocarbon charge with a preferred range being from 300 to 1500 SCF per barrel.

The catalyst recovered by the method of this invention is prepared initially by simply admixing the palladium chloride, $PdCl_2$, and anhydrous aluminum chloride, $AlCl_3$, in a hydrocarbon medium, such as the feed stock, under hydrogen. At the elevated temperatures suitable for hydrocracking, these compounds apparently form a complex which is the active catalyst for the hydrocracking reaction. It is also theorized as will be discussed herinafter that these compounds may also complex to some extent with hydrocarbon. It has been found that molar ratio of aluminum chloride to palladium chloride should be at least 2:1 but preferably a much higher molar ratio for example 100:1 or more should be employed since, as is well known, aluminum chloride itself tends to complex with hydrocarbons and thus there may be some loss in continuous processing.

In the prior art, various supported noble metal and other hydrogenation catalysts were made equivalent, i.e., nickel, platinum, palladium, rhodium and the like. This has not been found to be true for this invention since palladium chloride is distinctly unique and advantageous.

The palladium chloride used initially to prepare the catalyst mixture and recovered for reuse by the method of this invention is, of course, the more costly component of the catalyst. Only catalytic amounts of palladium are required, of example, 0.001 per cent by weight of palladium based on the weight of the hydrocarbon charge can be used satisfactorily. Amounts up to 1.0 weight per cent based on the weight of the charge can be used but such high concentrations are not ordinarily required. The amount of aluminum chloride can be as small as 2 moles per mole of the palladium chloride but preferably an excess is employed, for example, from 0.005 weight per cent based on the weight of the hydrocarbon charge up to as much as 10 weight per cent. Such high concentrations are not required and may be wasteful so concentrations from about 0.05 to 6.0 weight per cent based on the charge are completely satisfactory. The exact amounts of palladium chloride and aluminum chloride remaining in the recovered bottoms concentrate have not been fully determined. However, it is apparent that catalytic amounts within the ranges required to hydrocrack additional high molecular weight hydrocarbons are contained in the bottoms fraction catalyst concentrate either as a mixture or as a complex.

After removal of the hydrocarbon reaction products the remaining bottoms fraction catalyst concentrate will contain in addition to an insolubilized and precipitated aluminum chloride-palladium chloride mixture or complex other materials, resulting from the hydrocracking reaction, which is a complex mixture of compounds which have not been fully categorized and may include, for example, heavy carbonaceous materials, tars, polycondensed materials, sulfur and nitrogen compounds, unreacted resid and other materials with extremely high boiling points. The concentrate which is solid at room temperature is soluble in the hydrocarbon feed and/or products at reaction conditions.

The recovery of the aluminum chloride-palladium chloride bottoms concentrate and the hydrocracking process of this invention can be carried out by batch, semi-batch or continuous methods. Since the bottoms fraction catalyst concentrate is soluble there is not, of course, a catalyst bed but it is necessary for the hydrocarbon charge to remain in contact with the catalyst for a time sufficient to accomplish the desired degree of hydrocracking. Obviously the reaction time will vary with the type of charge stock, the severity of the reaction conditions (temperature and hydrogen pressure) as well as the degree of cracking desired. In general, therefore, reaction times can vary rather widely ranging from 2 to 3 seconds to 18 hours, with from 1 minute to 1 hour being satisfactory under continuous flow conditions. In batch or semi-continuous operations considerably longer times are required. Likewise some stocks hydrocrack far more readily and thus require much less time. Since commercially it is generally more economical to employ continuous flow, considerable flexibility may be required to be engineered into the system if a variety of feed stocks of widely differing compositions are to be processed in a single unit. This, however, is within the scope of the knowledge of those skilled in this art.

Since the catalyst is soluble in the hydrocarbon feed and/or products at reaction conditions it requires as set forth in this invention, special means for recovery and reuse. The original and recovered catalyst of this invention however have a unique set of properties which greatly simplifies recovery. The original catalyst or recovered bottoms fraction catalyst concentrate, although soluble at reaction temperatures, become insoluble and precipitates at lower temperatures, for example, at about 250°F. and below. By cooling the reaction products to this temperature and emoving all but a small bottoms fraction, such as a 10 to 15 volume per cent bottoms or even less, the catalyst is concentrated in this fraction which may then be recycled to contact fresh hydrocarbon. It has been shown that the aluminum chloride-palladium chloride mixture or complex can be recovered by the method of this invention in the form of a bottoms fraction concentrate and reused many times to hydrocrack additional hydrocarbons containing sulfur or nitrogen compounds or condensed ring aromatics and not be poisoned by their presence.

It is not known whether the catalyst is merely in the form of a palladium chloride-aluminum chloride complex or whether it is further complexed with hydrocarbon, however, it readily redissolves and disperses in the hot hydrocarbon charge without apparently any loss in activity. In a semi-continuous series of runs employing this technique, which runs were terminated only because of the lengthy time involved, the equivalent of 130 barrels of hydrocarbon charge per pound of palladium were processed using the recovered bottoms fraction catalyst concentrate without any pre-treatment of the catalyst concentrate with no loss in catalyst activity. This demonstrates that even if eventually the activity of the catalyst decreases to the point where it can no longer be used or if additional catalyst is required to make-up for losses, the catalyst cost per barrel of charge processed is competitive economically with present hydrocracking catalysts. Moreover, the instant process has the highly advantageous ability to process high molecular weight hydrocarbon stocks containing large amounts of sulfur and nitrogen compounds as well as condensed ring aromatics without any pretreatment process now required before such stocks can be hydrocracked with the conventional heterogeneous catalysts now in use.

The following examples are provided for the purpose of further illustrating the invention, but it is to be understood that these are not to be construed as limiting the invention to their disclosures.

EXAMPLE I

In the following runs a full boiling range West Texas Permian Crude was processed using a batch system with an autoclave pressured with hydrogen to the desired pressure. The crude has an API Gravity at 60°F. of 34.6, volume per cent overhead at 400°F. of 37.2, weight per cent sulfur of 1.4, weight per cent nitrogen of 0.1 and volume per cent boiling above 900°F. of 22.0. The conditions and results are shown in Table I.

TABLE I

| Conditions: | Run 1 | Run 2 |
| --- | --- | --- |
| $PdCl_2$ (Wt. % of Crude) | 0.0585 | 0.0585 |
| $AlCl_3$ (Wt. % of Crude) | 1.7 | 1.7 |
| Temperature °F. | 500 | 600 |
| $H_2$ Pressure, psig | 1500 | 1500 |
| Time, (Hrs.) | 8.0 | 8.0 |
| Products: | | |
| API Gravity at 60°F. | 45.3 | 51.4 |
| Volume % overhead at 400°F. | 46.5 | 60.0 |
| Volume % boiling above 900°F. | 17.5 | 9.0 |

It is clear that considerable hydrocracking was obtained, Run 2 showing excellent results because of the higher temperature. The light gas ($C_1$ to $C_3$'s) was less than 4 weight per cent and the coke production less than 3 weight per cent.

In runs 1 and 2 the reactor was cooled to 250°F. insolubilizing and allowing the catalyst to precipitate. The reaction products were removed leaving a bottoms fraction catalyst concentrate of about 10 volume per cent. When cooled to room temperature the concentrate became solid. This concentrate, soluble at hydrocracking temperatures, when reused to hydrocrack additional crude shows no significant loss in catalytic activity and is again recovered as a concentrate as described above for further use in hydrocracking high molecular weight hydrocarbons.

The following Example shows the method of hydrocracking extremly high molecular weight feeds such as crude extremely residua, recovery of the catalyst by the method of the invention and processing additional crude using the bottoms fraction catalyst concentrate.

EXAMPLE II

A resid from a Lagomedio crude, 100 volume per cent boiling above 800°F. with a range above 1000°F., an API Gravity at 60° of 7.3 and containing 3.1 weight per cent sulfur and 0.94 weight per cent nitrogen was hydrocracked as described in Example I. The conditions and products obtained are shown in Table II.

TABLE II

| Conditions: | Run 1 | Run 2 |
| --- | --- | --- |
| $PdCl_2$ (Wt. % of Resid) | 0.0167 | 0.0334 |
| $AlCl_3$ (Wt. % of Resid) | 5.0 | 0.24 |
| Temperature °F. | 600 | 750 |
| $H_2$ Pressure, psig | 1300 | 3000 |
| Time (Hrs.) | 18 | 16 |
| Products: | | |
| API Gravity at 60°F. | 15.9 | 22.8 |
| Light Gas ($C_1$ to $C_3$'s) Wt. % | | 5.1 |
| $C_4$ to 800°F., vol. % | | 64.7 |
| Vol. % boiling above 800°F. | | 26.6 |
| Coke, Wt. % | | 3.5 |
| Sulfur, Wt. % | | 1.8 |
| Nitrogen, Wt. % | | 0.49 |

It will be seen that the resid was extensively converted to a gas oil boiling below 800°F. with only minor yields of gas and coke. The sulfur and nitrogen contents remaining in the cracked products are typical of the instant catalyst system and its unique nature. Conventional, heterogeneous catalysts strongly adsorb these compounds so they are essentially completely removed before the catalyst is free to react with the hydrocarbons. It is clear that this "poisoning" effect which occurs with the conventional heterogeneous catalysts is absent with the instant catalyst since conventional catalysts would be useless in the cracking of a resid of the type shown.

Run 1 shows some hydrocracking but shows the need for more severe conditions as employed in Run 2. Run 2 was repeated a number of times by cooling the reactor to 250°F. removing the reaction products and leaving all but small bottoms fractions ranging between 4 and 15 volume per cent and then charging fresh resid. As has been described, the catalyst remains in this bottoms fraction as a concentrate and thus it was found that even when processing the equivalent of 130 barrels of resid per pound of palladium by this technique there was no observable significant loss in activity of the catalyst.

We claim:

1. A method for the recovery of an aluminum chloride-palladium chloride hydrocracking catalyst mixture utilized in hydrocracking high molecular weight hydrocarbons containing sulfur and nitrogen compounds at temperatures of from 400° to 1200°F. at pressures of from 100 psig to 5000 psig with from 100 to 5000 standard cubic feet of hydrogen per barrel of hydrocarbon charge, said catalyst being soluble in said hydrocarbons at said temperatures which comprises the steps of cooling the hydrocarbon reaction products to at least about 250°F. to substantially insolubilize and precipitate said catalyst;

removing the hydrocarbon reaction products leaving a bottoms fraction containing aluminum chloride-palladium chloride catalyst concentrate; and recovering said bottoms fraction catalyst concentrate for reuse, said concentrate being soluble in said hydrocarbons at said hydrocracking temperatures.

2. A method according to claim 1 wherein the hydrocarbon reaction products are removed leaving a bottoms fraction of up to 15 volume per cent containing aluminum chloride-palladium chloride catalyst concentrate.

3. A method according to claim 1 wherein the bottoms fraction containing said catalyst concentrate is recycled to contact and hydrocrack fresh feed high molecular weight hydrocarbons.

4. A method according to claim 3 wherein said hydrocarbons boil predominantly above 400°F.

5. A method according to claim 3 wherein in the bottoms fraction containing the aluminum chloride-palladium chloride catalyst concentrate the palladium ranges from 0.001 to 1.0 weight per cent based on the weight of the fresh hydrocarbon and the aluminum chloride ranges from 0.005 to 10.0 weight per cent based on the weight of the fresh hydrocarbon with the mole ratio of aluminum chloride to palladium chloride being at least 2:1.

6. A method according to claim 3 wherein said high molecular weight hydrocarbons boil above 800°F.

7. A method according to claim 4 wherein said high molecular weight hydrocarbons are a crude oil containing a minimum of from 0.3 to 1.5 combined weight per cent sulfur and nitrogen based on the weight of said crude.

* * * * *